US006714235B2

(12) United States Patent
Sugimoto

(10) Patent No.: US 6,714,235 B2
(45) Date of Patent: Mar. 30, 2004

(54) ELECTRONIC ENDOSCOPE SELECTOR

(75) Inventor: Hideo Sugimoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 229 days.

(21) Appl. No.: 09/736,284

(22) Filed: Dec. 15, 2000

(65) Prior Publication Data

US 2002/0047897 A1 Apr. 25, 2002

(30) Foreign Application Priority Data

Dec. 17, 1999 (JP) ............................. P11-358669

(51) Int. Cl.$^7$ ................................. H04N 7/18
(52) U.S. Cl. ........................................... 348/74
(58) Field of Search ........................ 348/74, 45, 46, 348/705, 65, 72, 721

(56) References Cited

U.S. PATENT DOCUMENTS

| | | | | |
|---|---|---|---|---|
| 4,884,134 A | * | 11/1989 | Tsuji et al. | 348/73 |
| 5,243,416 A | * | 9/1993 | Nakazawa | 348/74 |
| 5,305,098 A | * | 4/1994 | Matsunaka et al. | 348/65 |
| 5,335,662 A | * | 8/1994 | Kimura et al. | 600/459 |
| 5,877,802 A | * | 3/1999 | Takahashi et al. | 348/71 |
| 5,995,140 A | * | 11/1999 | Cooper et al. | 348/159 |
| 6,191,814 B1 | * | 2/2001 | Elberbaum | 348/211.14 |
| 6,246,432 B1 | * | 6/2001 | Takami et al. | 348/65 |

FOREIGN PATENT DOCUMENTS

| | | |
|---|---|---|
| JP | 3-101083 | 10/1991 |
| JP | 3101083 | 10/1991 |

OTHER PUBLICATIONS

English Language Translation of JP Appln. No. 3–101083.

* cited by examiner

*Primary Examiner*—Chris Kelley
*Assistant Examiner*—Behrooz Senfi
(74) *Attorney, Agent, or Firm*—Greenblum & Bernstein, P.L.C.

(57) ABSTRACT

An electronic endoscope selector that is used in an electronic endoscope system which shares peripheral devices, such as a TV monitor, VCR etc., among a plurality of electronic endoscopes. The electronic endoscope selector comprises switching circuits for switching and selecting video signals and synchronizing signals fed from one of the plurality of electronic endoscopes in the system. The selector also comprises ON/OFF switches and a timer. The ON/OFF switch controls output of the selected video signals. When the switching circuits switch between the plurality of electronic endoscope and switch video signals and synchronizing signals to that of a newly selected electronic endoscope, the output of video signals are suspended during a predetermined period, by the timer. On the other hand, the synchronizing signals are output simultaneously with the above switching.

11 Claims, 3 Drawing Sheets

ELECTRONIC ENDOSCOPE SELECTOR

BACKGROUND OF THE INVENTION

1. Field of the Invention

The present invention relates to an electronic endoscope system, which comprises a plurality of electronic endoscopes and peripheral devices, such as TV monitors or VCR's (video cassette recorder).

2. Description of the Related Art

In recent medical practice, various types of electronic endoscope systems, such as the RGB sequential or color chip systems, an ultrasonic systems, a system that captures a fluorescent image of exited cells in the interior of a hollow organ and so on, are used. Each electronic endoscope system is selectively utilized as the occasion may require. In electronic endoscopy, dissimilar to optical endoscopy that observes an optical image at the distal end of a fiber-optic bundle, an imaging device, such as a TV monitor, is required to observe the image captured by the above electronic endoscope.

In a large number of medical facilities, several types of electronic endoscope systems are utilized during a single checkup or medical examination since each type of electronic endoscope system has an exclusive purpose. In these facilities, it is the dissipation of space and cost of peripheral devices, such as TV monitors, video cassette recorders and so on, provided for each electronic endoscope system. It is also cumbersome and time consuming to operate the peripheral devices individually prepared for each system.

SUMMARY OF THE INVENTION

Therefore, it is preferable to share devices that have a common function among the electronic endoscope systems, such as a TV monitor, video cassette recorder (VCR), etc., and build a single organized electronic endoscope system. In order to share the peripheral devices among the plurality of electronic endoscope systems and build an organized electronic endoscope system, an electronic endoscope selector that mediates between each of the electronic endoscopes and the- peripheral devices is required.

The above organized electronic endoscope system comprises a plurality of electronic endoscope units, each of which comprises an endoscope with an elongated part for insertion into a body cavity or hollow organ, and an image-signal processing unit that processes image signals fed from an imaging device mounted on the distal end of the elongated part of the endoscope. Images captured by the imaging device are output from the image-signal processing unit to the electronic endoscope selector as video signals with a synchronizing signal. It takes time for the TV monitor to synchronize with the synchronizing signal fed from the newly selected electronic endoscope and if the electronic endoscope selector simultaneously switches both video signals and synchronizing signal from one electronic endoscope unit to another, unsynchronized video will be displayed on the TV monitor while the TV monitor is synchronizing with the synchronizing signal. Therefore, the electronic endoscope operator inevitably observes unsynchronized image on the TV monitor while the TV monitor is engaged in the synchronizing operation. This causes eyestrain to the operator, especially when the TV monitor is used in a darkened room to improve the observation of the image.

Therefore, an object of the present invention is to provide an electronic endoscope selector that enables a plurality of electronic endoscopes to share a peripheral device and integrate a plurality of electronic endoscope systems into a single organized electronic endoscope system. Further, the object of the present invention is to provide the electronic endoscope selector, which sends video of a selected electronic endoscope to a peripheral device without unsynchronized video when the electronic endoscope is switched to another electronic endoscope.

According to the present invention, there is provided an electronic endoscope selector comprising a video signal switching processor, a synchronizing signal switching processor and a switching control processor.

The video signal switching processor switches video signals, output to at least one peripheral device, between first video signals fed from a first electronic endoscope to second video signals fed from a second electronic endoscope. The synchronizing signal switching processor switches synchronizing signals, output to the peripheral device, between synchronizing signals fed from the first electronic endoscope to synchronizing signals fed from the second electronic endoscope. The switching control processor drives the video signal switching processor and synchronizing signal switching processor and suspends output of the video signal for a predetermined period after driving the synchronizing signal switching processor.

Preferably, the electronic endoscope selector comprises an operating processor for driving the switching control processor.

The switching control processor may drive the video signal switching processor and the synchronizing signal switching processor simultaneously. In this case, preferably, the switching control processor comprises an output switching processor and a timer. The output switching processor switches the video signals between the 'ON' and 'OFF' states. The ON state permits and the OFF state forbids output of the video signals. The timer is used for timing the predetermined period. Further, the output switching processor is set to 'OFF' and the timer is started when the synchronizing signal switching processor is driven. Furthermore, the output switching processor is switched to 'ON' after the predetermined period. The 'ON' and 'OFF' states for output control of the video signals from the video signal switching processor are switched by the output switching processor.

In another preferable example, the switching control processor drives the video signal switching processor for a predetermined period after driving the synchronizing signal switching processor, and suspends output of the video signals for a predetermined period.

Further, preferably, the signal switching processor comprises a first and second buffer circuit and the switching control processor comprises a first and second timer.

The first buffer circuit, to which input the first video signals are fed from the first electronic endoscope, controls the ON and OFF states of video signal output. The ON state permits video signal output, and the OFF state forbids video signal output. The second buffer circuit, to which input the second video signals are fed from the second electronic endoscope, controls the ON and OFF state of the video signal output. The first timer sets the first buffer circuit to the OFF state, which forbids output of the video signals, immediately after receipt of a control signal. The second timer sets the second buffer circuit to 'OFF' state immediately after input of a control signal. It also sets the second buffer circuit to 'ON' after a predetermined period from control signal input completion. Therefore, switching of the first and second video signals is controlled by the control signal, which is input alternately to the first and second timer.

Furthermore, the synchronizing signal switching processor comprises a third and fourth buffer circuit. The third buffer circuit receives synchronizing signals from the first electronic endoscope and controls the ON and OFF states of synchronizing signal output. The ON state permits output of the synchronizing signals and the OFF state forbids output. The fourth buffer circuit receives synchronizing signals from the second electronic endoscope and controls the ON and OFF states of synchronizing signal output. Switching the synchronizing signals is controlled by alternating the ON and OFF states of the third and fourth buffer circuits.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
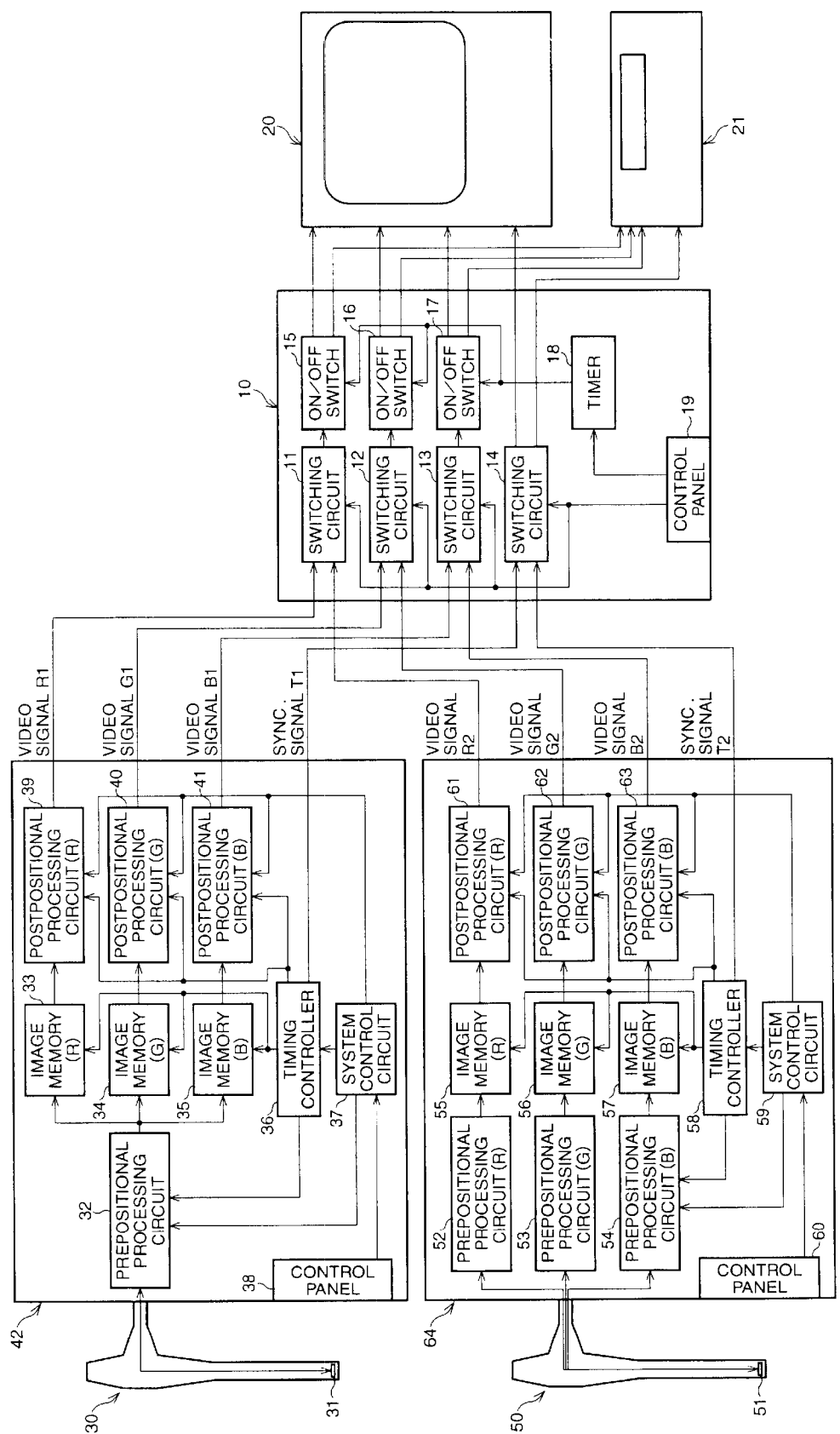
FIG. 1 is a schematic showing an electrical construction of an electronic endoscope system that is integrated with an electronic endoscope selector of the first embodiment of the present invention.

The present invention is described below with reference to the embodiments shown in the drawings.

FIG. 1 is a schematic showing an electrical construction of an electronic endoscope selector of the first embodiment of the present invention. In the figure, two types of conventional electronic endoscopes are connected to the electronic endoscope selector. Note that the optical components for illumination in the electronic endoscope units are omitted.

The TV monitor 20, the VCR 21 and the image-signal processing units 42, 64 are connected to the electronic endoscope selector 10. The image-signal processing unit 42 is for processing image signals captured by the conventional RGB sequential method. The image-signal processing unit 64 is for processing the image signals captured by a conventional color chip method. Namely, an endoscope 30 that captures images in the RGB sequential method is detachably attached to the image-signal processing unit 42 and an endoscope 50 that captures images in the color chip method is detachably attached to the image-signal processing unit 64. Images captured by the endoscope 30 or 50 are alternatively displayed on the TV monitor 20. This alternative selection of the images displayed on the TV monitor 20 is switched by operating the electronic endoscope selector 10. The images displayed on the TV monitor 20 may be simultaneously recorded on a videocassette tape by the VCR 21.

Firstly, the flow of image and video signals in the first electronic endoscope unit, which comprises the endoscope 30 and the image-signal processing unit 42, is described.

The imaging device 31 is provided at the distal end of the elongated part of the endoscope 30. Images from within body cavities or hollow organs are captured by the imaging device 31 as image signals and output via cables inside the endoscope 30, to the image-signal processing unit 42. The image signals, input to the image-signal processing unit 42, are amplified by a preamplifier (not shown), and then input to the prepositional processing circuit 32. In the prepositional processing circuit 32, filtering of video bandwidth, S/H (sample hold), amplifying, clamping, clipping and gamma correction processes, etc., are executed to the image signals. The signals are then converted to digital image signals and output from the prepositional processing circuit 32.

In the RGB sequential method, the images are sequentially captured in units of R (red), G (green) and B (blue) color images, thus the digital image signals output from the prepositional processing circuit 32 are also sequential signals of the R, G and B images. Each of the R, G and B image signals is transferred to, and temporary stored in, a respective image memory 33, 34 and 35 in accordance with the timing of the image signals. Namely, image data of the respective R, G, B images are separately stored in the corresponding image memory 33, 34 and 35. Timing for outputting and storing the RGB image signals at the prepositional processing circuit 32 and the image memory 33, 34 and 35 is controlled by the timing controller 36.

When one set of image data comprising R, G and B images are prepared in the image memory 33, 34 and 35, the individual R, G, B image data is converted to analog signals and output to the respective postpositional processing circuit 39, 40 and 41. In each of the postpositional processing circuits 39, 40 and 41, a filtering, amplifying, gamma correction, clamping, clipping, enhancing, signal level adjustment process and so on, are executed to each of the R, G, B image signals and transformed to the conventional standardized RGB component format, in other words RGB component video signals. Timing the output of the R, G, B image signals from the image memory 33, 34, 35 and driving the postpositional processing circuits 39, 40 and 41 is controlled by the timing controller 36.

The prepositional processing circuit 32, the timing controller 36 and the postpositional processing circuit 39, 40 and 41 are controlled by the system control circuit 37. The system control circuit 37 is also connected to the control panel 38, which is arranged with operating switches (not shown), and controlled by instruction signals generated in the control panel 38 when the switches on the panel are operated.

The RGB component video signals R1, G1 and B1, output from the respective postpositional processing circuits 39, 40 and 41, are fed to the switching circuits 11, 12 and 13 of the electronic endoscope selector 10 respectively, via the cables. At the same time, the synchronizing signal T1 is output from the timing controller 36 to the switching circuit 14 of the electronic endoscope selector 10.

The flow of image and video signals in the second electronic endoscope unit, which comprises the endoscope 50 and the image-signal processing unit 64 is described as follows:

The imaging device 51 is provided at the distal end of the elongated part of the endoscope 50. At the imaging device 51, which is adapted for the color chip method, the R, G and B image signals for any one field are individually and simultaneously obtained. Images of a body cavity or interior of a hollow organ, captured by the imaging device 51, are output as image signals via the cables inside the endoscope 50, to the image-signal processing unit 54. The image signals, input to the image-signal processing unit 64, are appropriately amplified by a preamplifier (not shown), then input to the prepositional processing circuits 52, 53 and 54. In the prepositional processing circuits 52, 53 and 54 a filtering of video bandwidth, S/H (sample hold), amplifying, clamping, clipping and gamma correction processes, etc., are executed to the image signals. The signals are then converted to digital image signals and output from the prepositional processing circuits 52, 53 and 54.

Each of the digital RGB image signals output from the respective prepositional processing circuits 52, 53 and 54 are temporally stored in the respective image memory 55, 56 and 57. Namely, image data corresponding to each of the R, G, B images are individually stored in each of the image memory 55, 56 and 57, respectively. The R, G, B image data stored in the image memory 55, 56, 57 is converted to analog signals and fed to each of the postpositional processing circuits 61, 62 and 63. In each of the postpositional processing circuits 61, 62 and 63, a filtering, amplifying, gamma correction, clamping, clipping, enhancing and signal level adjustment processes, etc., are executed to each of the R, G, B image signals and transformed in to conventional standardized RGB component video signals.

Timing for the prepositional processing circuits 52, 53, 54, the image memories 55, 56, 57 and postpositional processing circuits 61, 62, 63 is controlled by the timing controller 58. The prepositional processing circuits 52, 53, 54, the timing controller 58 and the postpositional processing circuits 61, 62 and 63 are controlled by the system control circuit 59. The system control circuit 59 is connected to the control panel 60, which is arranged with operating switches (not shown), and it is controlled by instruction signals generated by the control panel 60 when the switches on the panel are operated.

The RGB component video signals R2, G2 and B2, output from the respective postpositional processing circuits 61, 62 and 63, are fed via the respective cables to the switching circuits 11, 12 and 13 of the electronic endoscope selector 10. At the same time, the synchronizing signal T2 is output from the timing controller 58 to the switching circuit 14 of the electronic endoscope selector 10.

Switching operations among the RGB component video signals and the synchronizing signals, which are executed in the electronic endoscope selector 10, are explained as follows:

Each of the switching circuits 11, 12, 13 and 14 has a plurality of input channels and a single output channel. The switching circuit switches the selection among the input channels so that only signals from a single selected input channel may be output from the output channel. In this embodiment, there are two input channels in each switching circuit. Examples of the switching circuit are a conventional analog switch, a relay and so on. The RGB component video signals, which are output from the switching circuits 11, 12 and 13, are fed to the ON/OFF switches 15, 16 and 17, then transported to the TV monitor 20 and VCR 21 via the cables. On the other hand, the synchronizing signals output from the switching circuit 14 are directly fed to the TV monitor 20 and VCR 21 via the cables, and there is no ON/OFF switch provided between the switching circuit 14 and the peripheral devices. Note that, examples of the ON/OFF switches 15, 16, 17 are also a conventional analog switch, relay and so on.

The switching operations at the switching circuits 11 through 14 are controlled by instruction signals from the control panel 19. Further, these switching operations in the switching circuits 11 through 14 are executed simultaneously. Namely, when an operator operates a switch on the control panel 19 to switch the selected electronic endoscope, the output signals from each of the switching circuits 11–14 are switched to the alternative signals concurrently. Since output signals from the switching circuit 14 are directly fed to the TV monitor 20 and the VCR 21, the newly selected synchronizing signals are transferred to the TV monitor 20 and VCR 21 immediately the switching operation is executed.

On the other hand, ON/OFF switches 15, 16, 17 are switched to the OFF state when the switching operation is executed, and at a predetermined time after the switching operation, they are switched to the ON state. Namely, the RGB component video signals, which are fed from the switching circuits 11, 12, 13 to the TV monitor 20 or VCR 21 via ON/OFF switches 15, 16, 17, are output to the TV monitor 20 and VCR 21 only after a predetermined time has passed after the switching operation on the control panel 19. During this period, no image is displayed on the TV monitor 20 and the screen of the TV monitor 20 is blank.

Switching operations at the ON/OFF switches 15, 16, 17 are controlled by a signal from the timer 18. The above predetermined time, the time between the beginning of the OFF state and the beginning of the ON state in the ON/OFF switches 15, 16, 17, is sufficient, several minutes for example, for the peripheral device, the TV monitor 20, VCR 21 and etc., to synchronize with the synchronizing signals fed from a newly selected electronic endoscope unit. Note that, the timer 18 is a conventional timer, for example, a timer that counts the number of clock pulses from a clock pulse generator, a timer that utilizes the time constant of a R-C circuit, and so on.

As discussed above, according to the first embodiment, an electronic endoscope selector that is able to switch pictures on a display device such as TV monitor, without displaying unsynchronized video on the device, is obtained.

Figure 2:
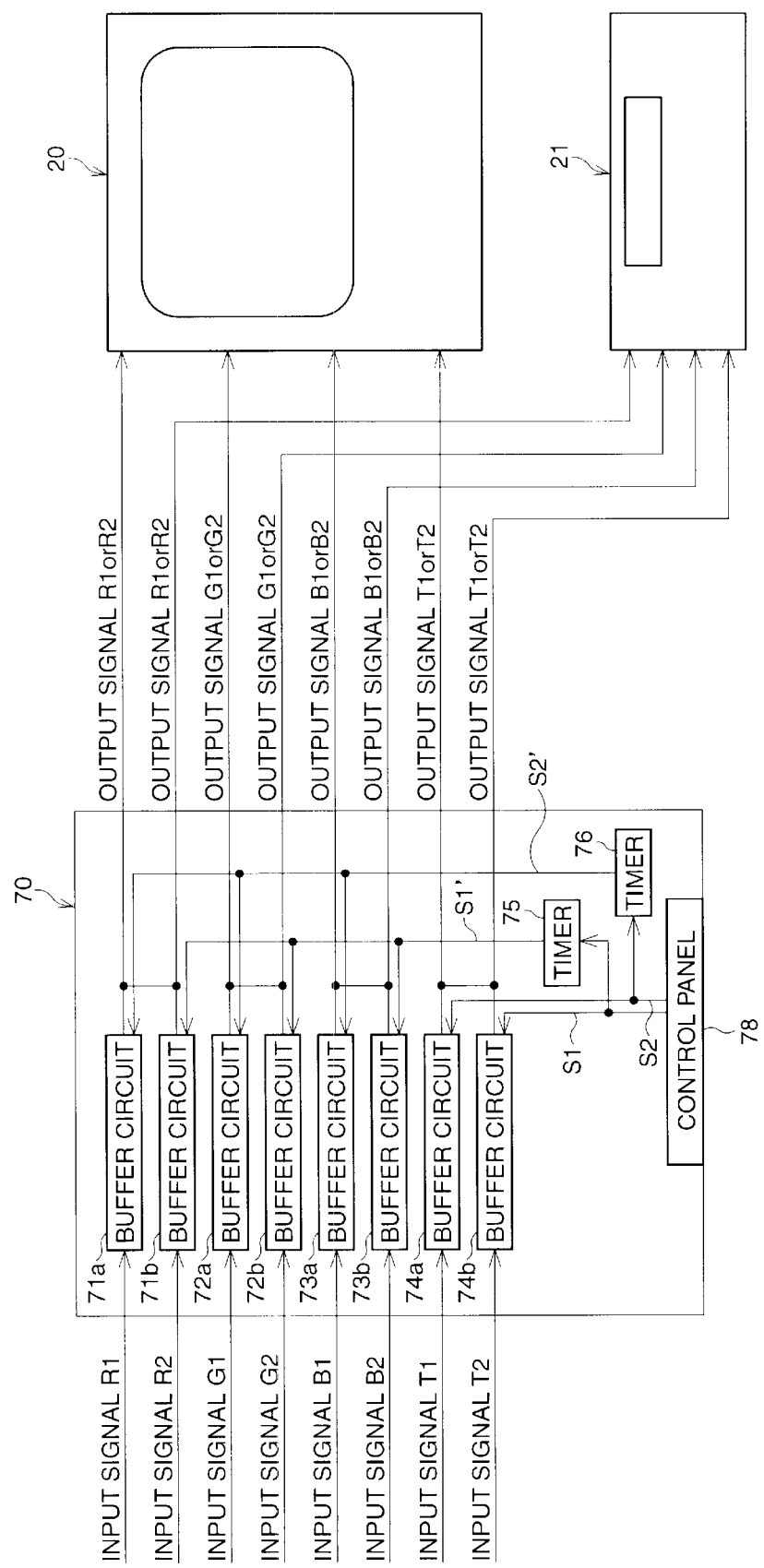
FIG. 2 is a schematic showing an electrical construction of an electronic endoscope selector of the second embodiment.
Figure 3:
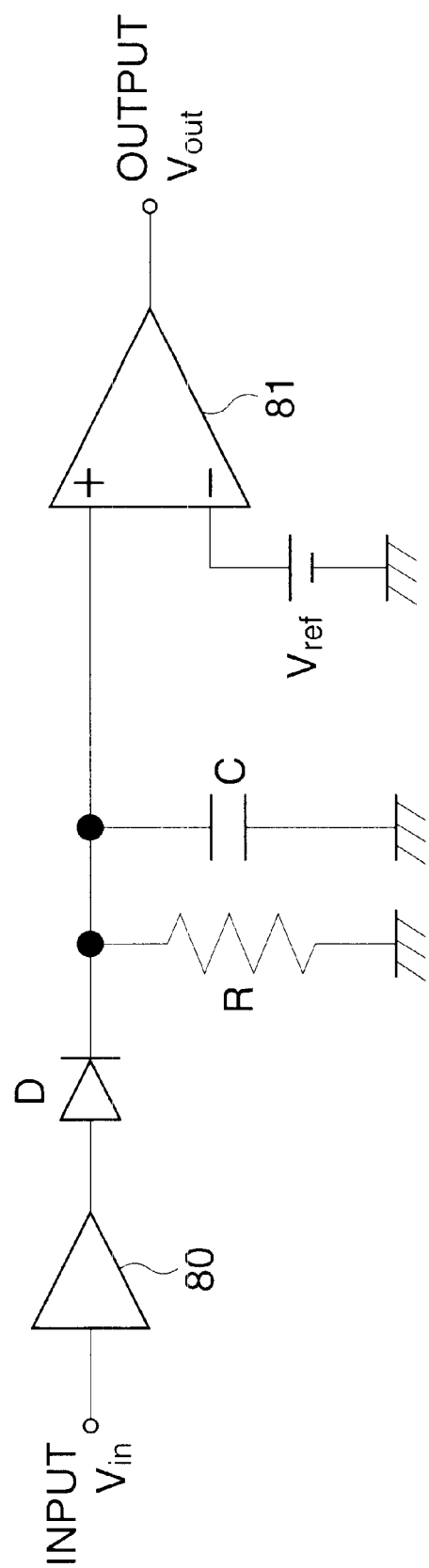
FIG. 3 is a circuit diagram of the timers shown in FIG. 2.

With reference to FIG. 2 and FIG. 3, an electronic endoscope selector of a second embodiment of the present invention is described.

FIG. 2 is a schematic showing the electrical construction of an electronic endoscope selector of the second embodiment. The electronic endoscope selector 70 is comprised of eight buffer circuits 71a, 71b through 74a, 74b, two timers 75, 76 and a control panel 78.

The component video signals R1 output from the first electronic endoscope unit and the component video signals R2 output from the second electronic endoscope unit, as shown in FIG. 1, are input to the buffer circuits 71a and 71b respectively. Similarly, the component video signals G1, G2 are input to the buffer circuits 72a, 72b, and the component video signals B1, B2 are input to the buffer circuits 73a, 73b. Note that, each of the input signals G1, G2, B1 and B2 is identical with the component video signals shown in FIG. 1. Further, the synchronizing signals T1 and T2, which are shown in FIG. 1, are input to the buffer circuits 74a and 74b, respectively.

An example of the buffer circuits is a cable driver of which output is controlled by signals applied to its control terminal. The control signals applied to the control terminal of the buffer circuit 71a–74a, 71b–74b comprise of two states, such as a high level 'H' and a low level 'L'. When the control signals of the buffer circuits 71a–74a, 71b–74b are 'H', the impedance of the output terminals of the buffer circuits 71a–74a, 71b–74b is high. Contrary, when the control signals of the buffer circuits 71a–74a, 71b–74b are 'L', the RGB component video signals and the synchronizing signals are output from the output terminal of the buffer circuits 71a–74a, 71b–74b. Namely, the buffer circuits 71a–74a, 71b–74b are a device, which is able to output the signals when the control signals applied to the control terminals are a low level 'L' and unable when the control signals are a high level 'H'. Also, each pair of output terminals of the buffer circuits are directly interconnected i.e. 71*a* with 71*b*, 72*a* with 72*b*, 73*a* with 73*b*, 74*a* with 74*b*.

The buffer circuits 71*a*–74*a*, 71*b*–74*b* output a set of RGB component video and synchronizing signals, which are alternative sets of R1, G1, B1, T1 signals and R2, G2, B2, T2 signals, from the alternative first and second electronic endoscope units. Either set of above signals is fed to the TV monitor 20 and VCR 21 in accordance with control signals from the control panel 78.

The leads S1, from the control panel 78, are connected to the control terminal of the buffer circuit 74*b* and an input terminal of the timer 75. On the other hand, the leads S2 from the control panel 78 are connected to the control terminal of the buffer circuit 74*a* and an input terminal of the timer 76. An output terminal of the timer 75 is connected to control terminals of the buffer circuits 71*b*, 72*b* and 73*b* via the leads S1', and an output terminal of the timer 76 is connected to the control terminals of the buffer circuits 71*a*, 72*a* and 73*a* via the leads S2'.

Therefore, while the component video signals from the first electronic endoscope unit is selected in the electronic endoscope selector 70, signals applied to the leads S2 and S2' are kept in the low level L, thus the output terminals of the buffer circuits 71*a*, 72*a*, 73*a* and 74*a* are ready to output the input signals. Contrarily, the leads S1 and S1' are kept in the high level H, and the impedance of the output terminal of the buffer circuits 71*b*, 72*b*, 73*b* and 74*b* is high. Thus, at this time, signals output from the electronic endoscope selector 10 are signals from the buffer circuits 71*a*, 72*a*, 73*a* and 74*a* only. Namely, the set of R1, G1, B1 and T1 signals only are output to the TV monitor 20 and VCR 21.

When an operator selects a switch on the control panel 78 to switch the video output fed from the first electronic endoscope unit to the second electronic endoscope unit, the status of leads S2 and S2' immediately changes from the low to the high level. Namely, the impedance of the output terminals of the buffer circuit 71*a*, 72*a*, 73*a* and 74*a* becomes high, and as a consequence, output from the buffer circuits 71*a*, 72*a*, 73*a* is 74*a* are forbidden.

The control signals in the leads S1 are also changed from the high to the low level, simultaneous with the operators selection with the switch on the control panel 78, and the output terminal of the buffer circuit 74*b* is switched to allow output. Namely, the synchronizing signal T2 is output to the TV monitor 20 and VCR 21 simultaneously with the above switching operation. On the other hand, the status of the leads S1' is changed from the high to the low level only after a predetermined time has passed. Namely, the timer 75 and the timer 76 immediately switch the output signals to the high level when the input signals are switched from 'low' to 'high' to stop video signal output, however, when the input signals are switched from 'high' to 'low', they switch the output signals from 'high' to 'low', to allow video signal output only after a predetermined time. Therefore, the output terminals of the buffer circuits 71*b*, 72*b* and 73*b* are able to allow output of the RGB component video signals of the second electronic endoscope unit, the video signals R2, G2 and B2, to the TV monitor 20 and VCR 21 only after a predetermined time has elapsed from the switching operation by the operator. Note that, as in the first embodiment, the above predetermined time is a time necessary and sufficient for peripheral devices like the TV monitor 20 and VCR 21 to synchronize with the synchronizing signals from an electronic endoscope unit. In other words, only video that is synchronized with the synchronizing signals of an electronic endoscope unit is displayed on the TV monitor 20 and unsynchronized video is never displayed on the monitor.

However, although the above description represents the case where video output is switched from the first electronic endoscope unit to the second electronic endoscope unit, the operation is the same when video output is switched from the second electronic endoscope unit to the first electronic endoscope unit.

Next, behavior of the timer 75 and timer 76 are explained with reference to FIG. 3. FIG. 3 is a circuit diagram of the timers 75 and 76.

Firstly, action of the timers 75, 76, when the control signal or the input signal $V_{in}$ switches from the low to the high level, is explained. The diode D is forward biased when the high level signal is applied to the input terminal, so that current flows through the buffer 80, the diode D, resistor R and charges the capacitor C. The current flow causes a difference of electric potential between the two terminals of the resistor R, and electric charge is accumulated in the capacitor C. The electric potential difference is compared with the electric potential $V_{ref}$ at the comparator 81. The potential $V_{ref}$, for example, is may be set to half the high level signal H, (H/2). When the potential difference across the terminals of resistor R is greater than the reference potential $V_{ref}$, the comparator 81 outputs a signal $V_{out}$ as the high level signal H. Note that, when the potential $V_{ref}$ is set to the level H/2, the resistance of the resistor R is chosen so that the potential difference between the terminals of the resistor R is greater than level H/2 when the input signal $V_{in}$ is the high level H. Namely, when the control signals output to the leads S1 and S2 switch from the low level L to the high level H, and the input signals of the timers 75, 76 switch from L to H, the output signals from the timers 75, 76 are immediately switched to the high level H from the low level L. Thus, the control signals output to the leads S1' and S2', connected to the respective output terminals of the timer 75 and timer 76, immediately switch to the high level H from the low level L.

Contrarily, when the control signal, or input signal $V_{in}$, switches to the low level 'L' from the high level 'H', a reverse bias is applied to the diode D. In this case, since electric charge has been accumulated in the capacitor C, electric potential, applied to the input terminal of the comparator 81, exponentially decreases in accordance with the time constant comprised of capacitance of the capacitor C and the resistance of the resistor R, while discharging. When a difference of electric potential between the two terminals of the capacitor C decreases to $V_{ref}$ or less, the output signal $V_{out}$, which is the output from the timer 75 and timer 76, switches to the low level L from the high level H. The time for the potential difference between the two terminals of capacitor C to become $V_{ref}$ or less, is a predetermined time used for synchronizing the TV monitor 20 or VCR 21 to a newly selected electronic endoscope. Therefore, the control signals applied to the leads S1' and S2', connected to the output terminals of timers 75 and 76, are also maintained at the high level until the predetermined time elapses. During this period, video signals are not fed to the TV monitor 20 and VCR 21, etc., and there is no display on the TV monitor 20.

As described above, according to the second embodiment, effects similar to the first embodiment is obtainable.

Note that, in the present embodiments, each of the image-signal processing units 42, 46, TV monitor 20 and VCR 21 are detachably connected to the electronic endoscope selector 10 via connectors (not shown).

The RGB sequential method and the color chip method are mentioned as examples of image capturing method of an electronic endoscope utilized in the present embodiments. However, image capturing method of the electronic endoscope is not limited to the above methods, and an electronic endoscope may also utilize an ultrasonic endoscope system or an electronic endoscope system that captures a fluorescent image of excited cells in the interior of a hollow organ. Further, in the present embodiments, only two electronic endoscopes or electronic endoscope units are described as being connected to the electronic endoscope selector, although any number of electronic endoscopes may be connected.

In the present embodiments, the RGB component video signals and its synchronizing signals are used as an example of video signals, video signals in other format may be used in the present invention, if the components of the video signals are separated from the synchronizing signals, such as color difference signals and luminance signals.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 11-358669 (filed on Dec. 17, 1999), which is expressly incorporated herein, by reference, in their entireties.

What is claimed is:

1. An electronic endoscope selector comprising:
   a video signal switching processor that switches video signals, which are output to at least one peripheral device, from first video signals fed from a first electronic endoscope to second video signals fed from a second electronic endoscope;
   a synchronizing signal switching processor that switches synchronizing signals, which are output to said peripheral device, from synchronizing signals fed from said first electronic endoscope to synchronizing signals fed from said second electronic endoscope; and
   a switching control processor that drives said video signal switching processor and said synchronizing signal switching processor, and suspends output of said video signals for a predetermined period while the switched synchronizing signals are output, the predetermined period being longer than the time required for the synchronizing signal to synchronize with said peripheral device, wherein:
   said switching control processor drives said video signal switching processor for a predetermined period after driving said synchronizing signal switching processor, and suspends output of said video signals during said predetermined period;
   said video signal switching processor comprises:
      a first buffer circuit that receives said first video signals and controls ON and OFF states for outputting said first video signals, wherein said ON state permits output of said first video signals and said OFF state forbids output of said first video signals; and
      a second buffer circuit that receives said second video signals and controls ON and OFF states for output of said second video signals, wherein said ON state permits output of said second video signals and said OFF state forbids output of said second video signals; said switching control processor comprises:
         a first timer that sets said state of said first buffer circuit to said OFF state, which forbids the output of said first video signals, immediately after input of a control signal for setting the output of said first and second buffer circuit to said OFF state; and
         a second timer that sets said state of said second buffer circuit to said OFF state immediately after input of said control signal and sets said state of said second buffer circuit to said ON state after said predetermined period from completion of said input of said control signal; and
   a switching of said video signals is controlled by said control signal, which is alternately input to said first and second timer.

2. A selector according to claim 1, comprising an operating processor that is used for operating the driving of said switching control processor.

3. A selector according to claim 1, wherein said switching control processor drives said video signal switching processor and said synchronizing signal switching processor simultaneously.

4. A selector according to claim 1, wherein said synchronizing signal switching processor comprises:
   a third buffer circuit that receives synchronizing signals from said first electronic endoscope and controls ON and OFF states for outputting said synchronizing signals, wherein said ON state permits output of said synchronizing signals and said OFF state forbids output of said synchronizing signals; and
   a fourth buffer circuit that receives synchronizing signals from said second electronic endoscope and controls ON and OFF states for output of said synchronizing signals, wherein said ON state permits output of said synchronizing signals and said OFF state forbids output of said synchronizing signals; and
   wherein a switching of said synchronizing signals is controlled by alternate switching of said ON and OFF states of said third and fourth buffer circuits.

5. A selector according to claim 1, wherein said synchronizing signal switching processor completes synchronization of the synchronizing signals before said video signal switching processor outputs the video signals to said peripheral device.

6. An electronic endoscope selector comprising:
   a video signal switching processor that switches video signals, which are output to at least one peripheral device, from first video signals fed from a first electronic endoscope to second video signals fed from a second electronic endoscope;
   a synchronizing signal switching processor that switches synchronizing signals, which are output to said peripheral device, from synchronizing signals fed from said first electronic endoscope to synchronizing signals fed from said second electronic endoscope, said synchronizing signal switching processor comprising:
      a third buffer circuit that receives synchronizing signals from said first electronic endoscope and controls ON and OFF states for outputting said synchronizing signals, wherein said ON state permits output of said synchronizing signals and said OFF state forbids output of said synchronizing signals; and
      a fourth buffer circuit that receives synchronizing signals from said second electronic endoscope and controls ON and OFF states for output of said synchronizing signals, wherein said ON state permits output of said synchronizing signals and said OFF state forbids output of said synchronizing signals; and a switching control processor that drives said video signal switching processor and said synchronizing signal switching processor, and suspends output of said video signals for a predetermined period while the switched synchronizing signals are output, the predetermined period being longer than the time required for the synchronizing signal to synchronize with said peripheral device;

wherein a switching of said synchronizing signals is controlled by alternate switching of said ON and OFF states of said third and fourth buffer circuits.

7. A selector according to claim 6, comprising an operating processor that is used for operating the driving of said switching control processor.

8. A selector according to claim 6, wherein said switching control processor drives said video signal switching processor and said synchronizing signal switching processor simultaneously.

9. A selector according to claim 6, wherein said switching control processor drives said video signal switching processor for a predetermined period after driving said synchronizing signal switching processor, and suspends output of said video signals during said predetermined period.

10. A selector according to claim 9, wherein said video signal switching processor comprises:

a first buffer circuit that receives said first video signals and controls ON and OFF states for outputting said first video signals, wherein said ON state permits output of said first video signals and said OFF state forbids output of said first video signals;

a second buffer circuit that receives said second video signals and controls ON and OFF states for output of said second video signals, wherein said ON state permits output of said second video signals and said OFF state forbids output of said second video signals; and said switching control processor comprising:

a first timer that sets said state of said first buffer circuit to said OFF state, which forbids the output of said first video signals, immediately after input of a control signal for setting the output of said first and second buffer circuit to said OFF state;

a second timer that sets said state of said second buffer circuit to said OFF state immediately after input of said control signal and sets said state of said second buffer circuit to said ON state after said predetermined period from completion of said input of said control signal; and wherein a switching of said video signals is controlled by said control signal, which is alternately input to said first and second timer.

11. A selector according to claim 6, wherein said synchronizing signal switching processor completes synchronization of the synchronizing signals before said video signal switching processor outputs the video signals to said peripheral device.

* * * * *